US006646866B2

(12) United States Patent
Kao (10) Patent No.: US 6,646,866 B2
(45) Date of Patent: Nov. 11, 2003

(54) PROTECTIVE CASE FOR A TABLET PERSONAL COMPUTER

(75) Inventor: Chi-Lie Kao, 6F, No. 8-1, Lane 67, Sec. 1, Jin-Shan S. Rd., Taipei City (TW)

(73) Assignee: Chi-Lie Kao, Taipei (TW)

( * ) Notice: Subject to any disclaimer, the term of this patent is extended or adjusted under 35 U.S.C. 154(b) by 21 days.

(21) Appl. No.: 10/063,161

(22) Filed: Mar. 27, 2002

(65) Prior Publication Data

US 2003/0184958 A1 Oct. 2, 2003

(51) Int. Cl.$^7$ .................................................. G06F 1/16
(52) U.S. Cl. ........................ 361/683; 361/681; 312/216; 439/638; 710/303
(58) Field of Search ................................ 361/679–687, 361/724–727; 312/223.1–223.6, 216; 364/708.1; 710/303, 73; 439/638; 360/97.01, 98.01

(56) References Cited

U.S. PATENT DOCUMENTS

| 5,313,051 | A | * | 5/1994 | Brigida et al. ............... 235/375 |
| 6,456,491 | B1 | * | 9/2002 | Flannery et al. ............ 361/685 |
| 6,519,141 | B2 | * | 2/2003 | Tseng et al. ................. 361/683 |
| 6,519,144 | B1 | * | 2/2003 | Henrie et al. ............... 361/686 |
| 2003/0081375 | A1 | * | 5/2003 | Yamamoto ................... 361/681 |

* cited by examiner

Primary Examiner—Darren Schuberg
Assistant Examiner—Hung Van Duong
(74) Attorney, Agent, or Firm—Winston Hsu (57) ABSTRACT

A protective case to store a tablet PC. The tablet PC includes a touch display panel and a button. The protective case includes a housing for storing the tablet PC, and a button portion corresponding to the position of the button on the tablet PC. The housing has an access opening for inserting and taking out the tablet PC, and a display opening for exposing the touch display panel of the tablet PC.

19 Claims, 8 Drawing Sheets

PROTECTIVE CASE FOR A TABLET PERSONAL COMPUTER

BACKGROUND OF THE INVENTION

1. Field of the Invention

The present invention relates to a protective case for a tablet personal computer, and more specifically, the present invention discloses a protective case for storing the tablet personal computer while allowing the operation of the tablet personal computer without opening the case.

2. Description of the Prior Art

A tablet PC is a small, pen-driven computer. The pen can control the computer and perform document processing without using a keyboard or mouse. The dimensions of the tablet PC are larger than a PDA and generally larger than a 10 inch LCD touch panel. The tablet PC may have a touch display panel and may be able to connect to another PC through a cabled or a wireless means. To operate the tablet PC, which is similar to common writing types, a special pen is used with a touch display screen to perform various operating procedures. The tablet PC, which combines the functions of a wireless web with a notebook computer, fills an important need in the processing of information.

When a user buys a tablet PC, a brief case is additionally purchased to store and protect the tablet PC. When the user wishes to operate the tablet PC, the brief case needs be opened first. After operating the tablet PC, the user needs store the tablet PC inside the brief case again. Accordingly, during traveling or situations of frequent relocation it is very inconvenient for the user to operate the tablet PC because of the brief case.

SUMMARY OF INVENTION

It is therefore a primary objective of the claimed invention to provide a protective case for storing a tablet PC while allowing the operation of the tablet personal computer without opening the case.

The claimed invention, briefly summarized, discloses a protective case for storing a tablet PC. The tablet PC includes a touch display panel and a button. The protective case includes a housing for storing the tablet PC, and a button portion corresponding to the position of the button(s) on the tablet PC. The housing has an access opening for inserting and removing the tablet PC, and a display opening for exposing the touch panel of the tablet PC.

It is an advantage of the claimed invention that the claimed protective case for storing a tablet PC provides the functions of rain-proofing, protection, and convenience for carrying. Additionally, when a user wishes to operate the tablet PC, the user does not need to remove the tablet PC from the protective case, only to directly operate or release the engaging portion of roller blind of the protective case.

These and other objectives and advantages of the claimed invention will no doubt become obvious to those of ordinary skill in the art after reading the following detailed description of the preferred embodiment that is illustrated in the various figures and drawings.

DETAILED DESCRIPTION

Figure 1:
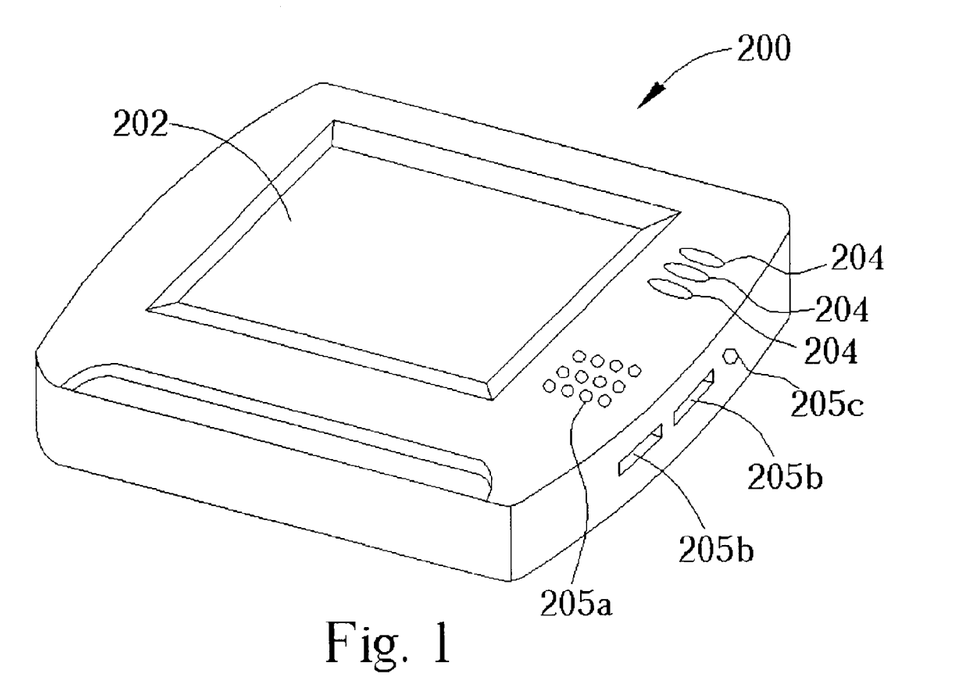
FIG. 1 is a perspective view of a tablet PC.
Figure 2:
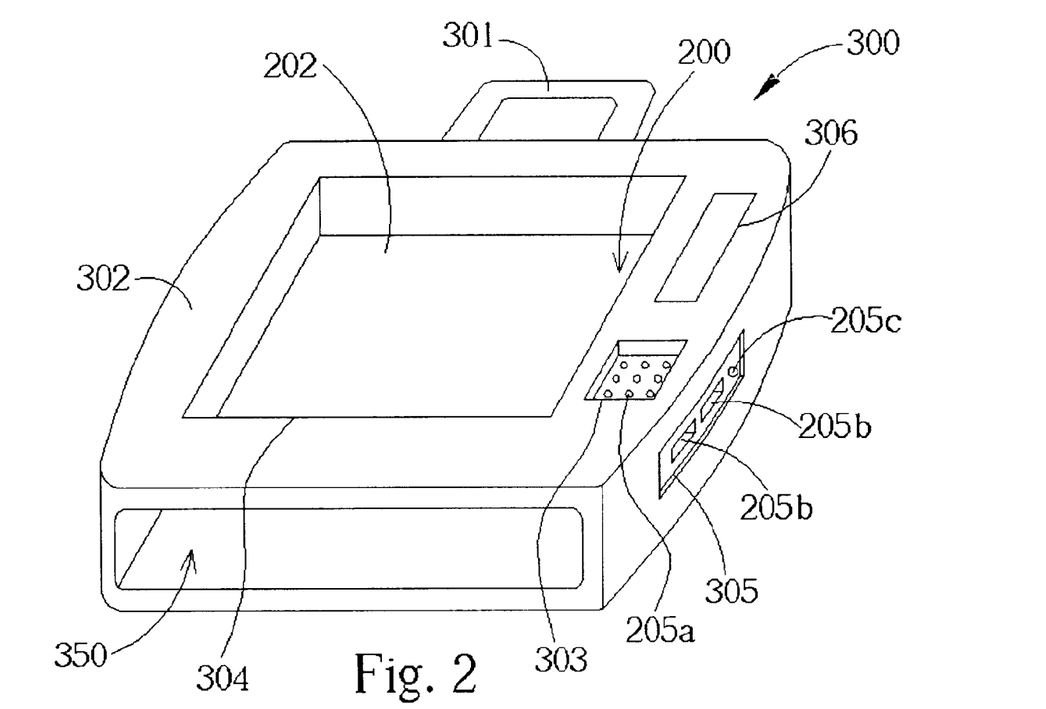
FIG. 2 is a perspective view of a protective case for a tablet PC according to the present invention.

Please refer to FIG. 1 and FIG. 2. FIG. 1 is a perspective view of a tablet PC 200. FIG. 2 is a perspective view of a protective case 300 of the tablet PC 200 according to the first preferred embodiment of the present invention.

As shown in FIG. 1, the tablet PC 200 comprises a touch display panel 202, a plurality of buttons 204, a plurality of sound emitting apertures 205a, an input/output (I/O) port 205b, and an input/output (I/O) terminal 205c. As shown in FIG. 2, the present protective case 300 is used to store the tablet PC 200. The protective case 300 comprises a housing 302 for storing and fixing the tablet PC 200, and a handle 301 connected to the housing 302. The material of the handle 301, which serves as rain proofing and surface protection, is not necessarily the same material as the housing 302. Additionally, the protective case 300 without the handle 301 also corresponds to the spirit of the present invention.

The housing 302 storing the tablet PC 200 comprises an access opening 350, a display opening 304, a button portion 306, and apertures 303 and 305. The access opening 350, which has an optimum position on one side of the housing 302, is used to insert and remove the tablet PC 200. A zipper (not shown) can be installed within the access opening 350 for opening and closing the access opening 350. Additionally, a user can install an engaging portion (not shown) on one side of the access opening 350, and a fixing portion (not shown) at the other side of the access opening 350 for securing the tablet PC 200 after the tablet PC 200 is positioned inside the protective case 300.

The display opening 304 exposes the touch display panel 202 of the tablet PC 200. The button portion 306 is located corresponding to positions of the buttons 204. The aperture 303 exposes the sound emitting apertures 205a, and the aperture 305 exposes the I/O port 205b and the I/O terminal 205c. When the tablet PC 200 is positioned inside the protective case 300, the I/O port 205b and the I/O terminal 205c of the tablet PC 200 can be directly used through the aperture 305 and the tablet PC 200 emits sound through the aperture 303.

Construction variations of the button portion 306 are illustrated in FIG. 3 to FIG. 6. In the four variations, the button portion 306 is respectively represented as 306a, 306b, 306c, and 306d.

Figure 3:
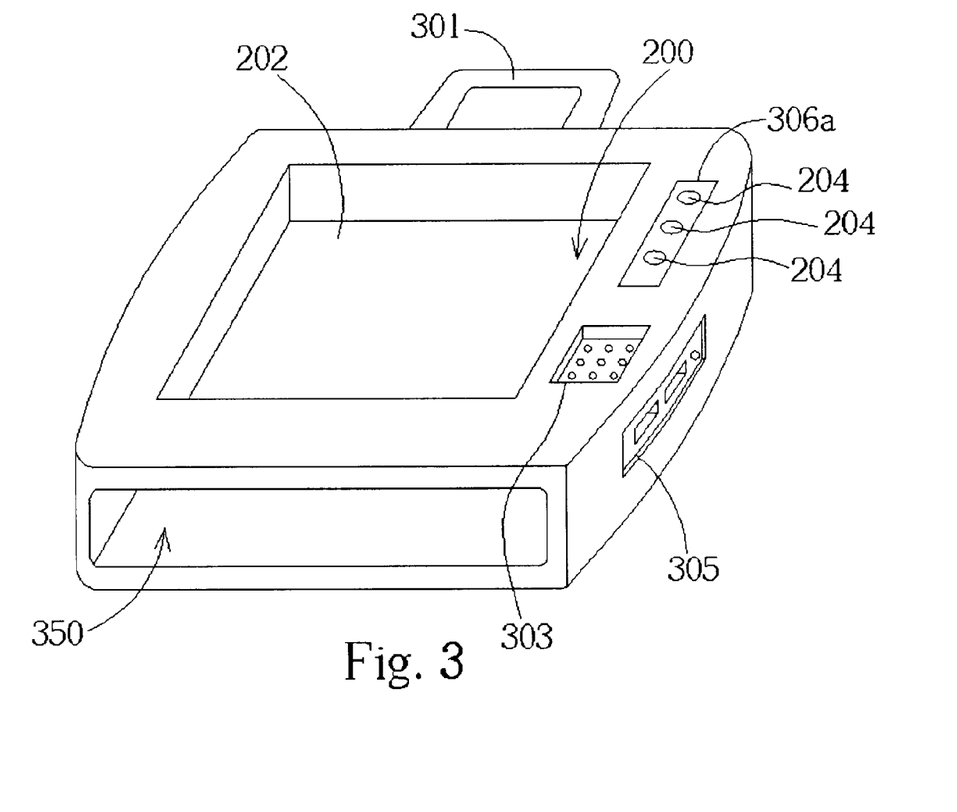
FIG. 3 to FIG. 6 are perspective views of a button portion according to the present invention.

Please refer to FIG. 3. FIG. 3 is a perspective view of the button portion 306a according to a variation of the first preferred embodiment. The button portion 306a, which corresponds to the buttons 204 of the tablet PC 200, has a soft transparent sheet. The transparent characteristic of the sheet allows identification of the positions of the buttons 204 by a user, and the soft characteristic of the sheet allows depression of the buttons 204 by the user through the button portion 306a.

Figure 4:
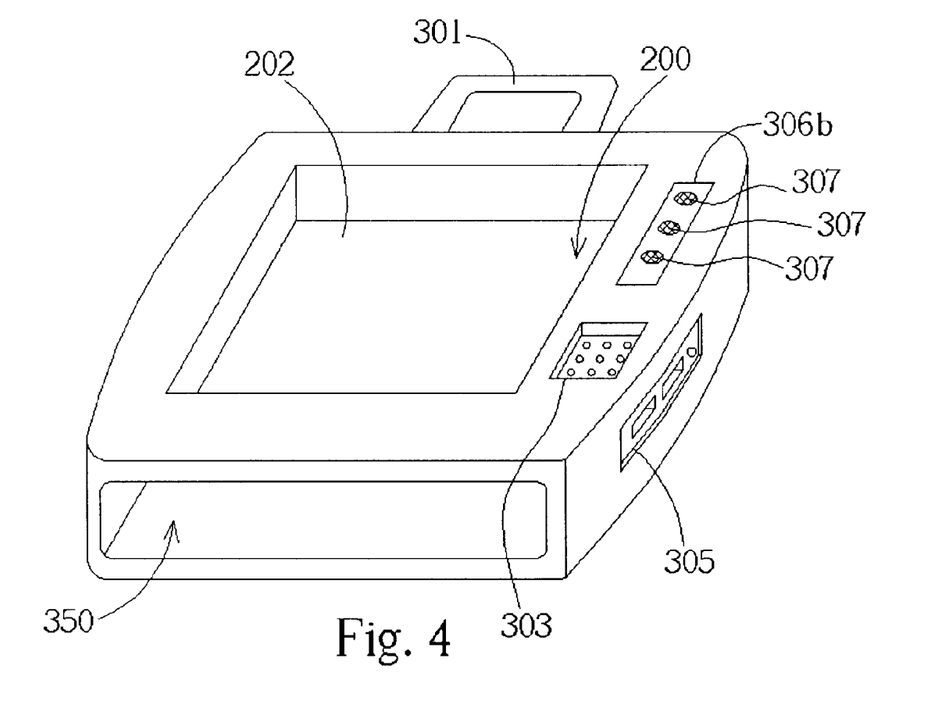

Please refer to FIG. 4. FIG. 4 is a perspective view of the button portion 306b according to another variation of the present invention. The button portion 306b, which corresponds to the buttons 204 of the tablet PC 200, is not limited to a transparent material. That is, the button portion 306b has a soft sheet only. The button portion 306b further comprises a mark 307 for identifying the positions of the buttons 204 so that the buttons 204 can be depressed through the sheet.

Figure 5:
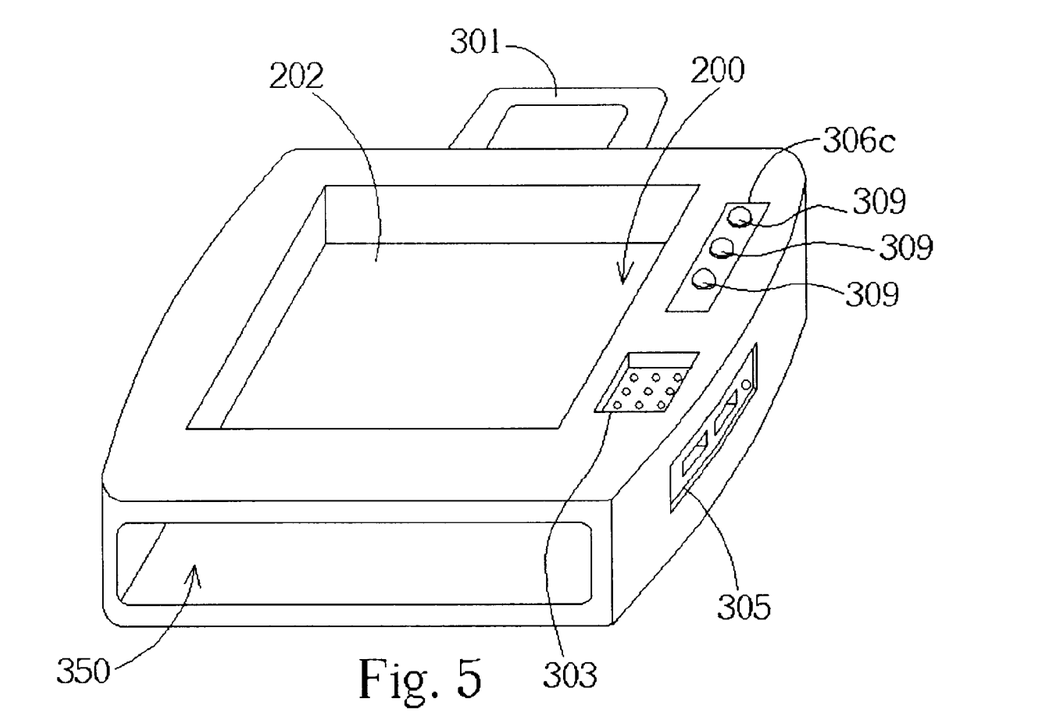

Please refer to FIG. 5. FIG. 5 is a perspective view of the button portion 306c according another variation of the present invention. The button portion 306c, which corresponds to the buttons 204 of the tablet PC 200, is not limited as a soft material. That is, the button portion 306c has a hard sheet only. The button portion 306c further comprises a depressing device 309 for the user to depress the buttons 204 through the depressing device 309.

Figure 6:
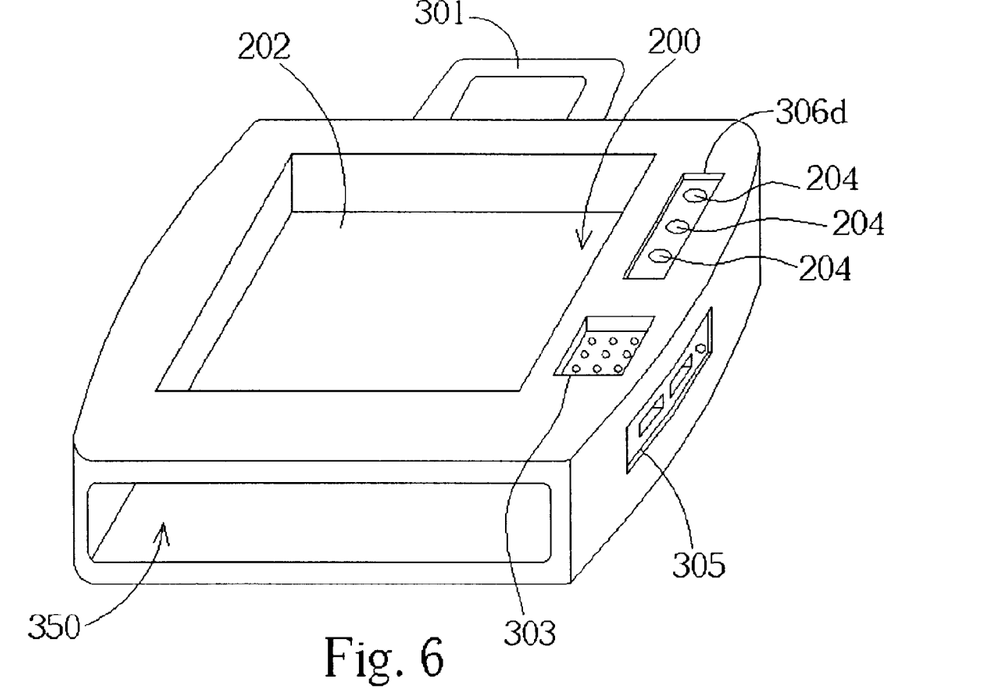

Please refer to FIG. 6. FIG. 6 is a perspective view of the button portion 306d according to another variation of the present invention. The button portion 306d, which corresponds to the buttons 204 of the tablet PC 200, exposes the buttons 204 of the tablet PC 200.

As mentioned above, the protective case 300 can accommodate various types of touch panel displays, such as an electromagnetic type, an optical type, and a resistance type etc, due to the hollow structure of the display opening 304. Accordingly, the display opening 304 not only exposes the touch display panel 202 of the tablet PC for viewing, but also permits operation by touching the touch display panel 202.

That the above-mentioned tablet PC 200 has buttons 204 is serves only as an example. If the tablet PC 200 has no buttons and utilizes a button image on the tablet PC 200 to replace the buttons 204, it also corresponds to spirit of the present invention that installs no button portion on the housing 302, and to install the access opening 350 and the display opening 304 on the housing 302 only.

Figure 7:
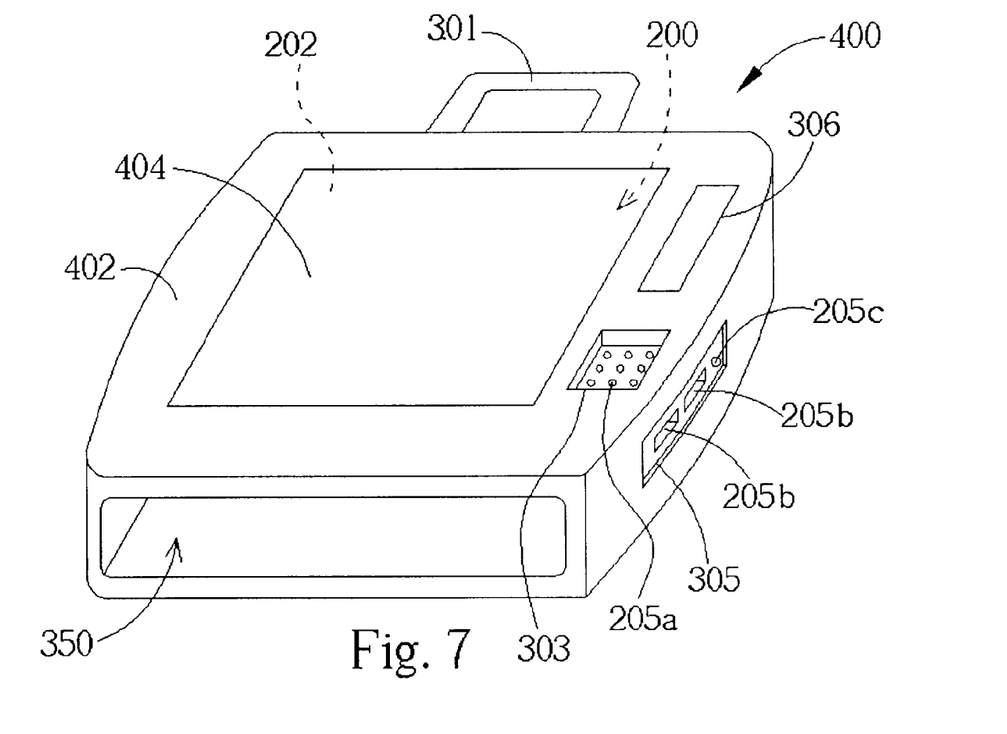
FIG. 7 is a perspective view of another protective case for a tablet PC according to the present invention.

Please refer to FIG. 7. FIG. 7 is a perspective view of another protective case 400 of the tablet PC 200 according to the present invention. The difference between the first and second preferred embodiments is that the latter replaces the hollow display opening 304 with a transparent display portion. As shown in FIG. 7, the protective case 400 comprises a housing 402 for storing and fixing the tablet PC 200, and a handle 301 connected with the housing 402 for a user to hold. The material of the handle 301, which serves as rain proofing and surface protection, is not necessarily the same material as the housing 402. Additionally, the protective case 400, without the handle 301 also corresponds to the spirit of the present invention.

The housing 402 storing the tablet PC 200 comprises an access opening 350, a display portion 404, and a button portion 306. The access opening 350, which has an optimum position on one side of the housing 402, is used to insert and remove the tablet PC 200. A zipper (not shown) can be installed within the access opening 350 for opening and closing the access opening 350. An engaging portion (not shown) can be installed on one side of the access opening 350 and a fixing portion (not shown) installed on the other side of the access opening 350 for securing the tablet PC 200 after the tablet PC 200 is positioned inside the protective case 400.

The display portion 404, which corresponds to the touch display panel 202 of the tablet PC 200, is formed of a soft transparent material and has a smooth surface. The display portion 404 and the touch display panel 202 are ideally separated by less than 0.6 cm, and the optimum distance is less than 0.2 cm. The button portion 306 corresponds to the positions of the buttons 204. A user can directly view the touch display panel 202 due to the transparent characteristic of the display portion 404. Therefore, the user interfaces with the touch display panel 202 by touching the display portion 404 and thereby indirectly touching the touch display panel 202 so that the display portion 404 allows operation of a resistance type (contacting type) or electromagnetic type (induced type) touch display panels 202.

As mentioned above, when the distance between the display portion 404 and the touch display panel 202 is less than 0.6 cm, such as 0.2 cm, the user can interface with the touch display panel 202. If the distance between the display portion 404 and the touch display panel 202 is larger than 0.6 cm, the point switch of a touch pen (not shown) may be reacted due to pressure between the display portion 404 and the touch pen before contacting the touch display panel 202. This situation will cause the tablet PC to have operational errors.

If the display portion 404 is formed by the soft material, a time point or a distance point of operation will be changed due to long-term or repetitive touches by the user causing inconvenience. Therefore, the display portion 404 still needs certain rigid materials to increase resistance to deformation. The optimum material of the display portion 404 is a wear-resisting material, such as a transparent film material used for a resistance type touch panel, to prevent the display portion 404 from wearing.

In the second preferred embodiment, the display portion 404 is not limited to a structure formed by the soft transparent material. If the display portion 404 is formed by a non-soft material, the user can also use the induced type to operate the touch display panel 202, and therefore can be applied in a touch operation of the electromagnetic type.

Variations of the button portion 306, which are similar to the first preferred embodiment illustrated in FIG. 3 to FIG. 6. In the four variations, the button portion 306 is respectively represented as 306a, 306b, 306c, and 306d.

When the protective case 400 uses the soft transparent material to form the display portion 404, the display portion 404 has a smooth surface and the distance between the touch display panel 202 and the display portion 404 is less than 0.6 cm. Therefore, the protective case 400 can be used with resistance type and electromagnetic type touch panels. Furthermore, when the protective case 400 uses the rigid transparent material to form the display portion 404, the protective case 400 can be used with the electromagnetic type touch panel. If the display portion 404 formed by the rigid transparent material that corresponds to an induced operation of the touch display panel 202 is used, the display portion 404 needs not contact the touch display panel 202. In principle, the distance between the display portion 404 and the touch display panel 202 should be less than 2 cm, and less than 0.2 cm is better, to prevent the electromagnetic type touch panel from losing sensitivity.

As the second preferred embodiment of the present described, the touch display panel 202 is covered with a display portion 404 formed of a soft transparent material. The display portion 404 and the touch display panel 202 are separated by less than 0.6 cm so that interface with the touch display panel 202 through the display portion 404 is permitted. If the touch display panel 202 is covered with a display portion 404 formed of a rigid transparent material, the user can interface with the touch display panel 202 electromagnetically.

The above-mentioned tablet PC 200 having buttons 204 serves only as an example. If the tablet PC 200 has no buttons and utilizes a button image on the tablet PC 200 to replace the buttons 204, it also corresponds to spirit of the present invention by having no button portion on the housing 402 and only the access opening 350 and the display portion 404 on the housing 402.

Figure 8:
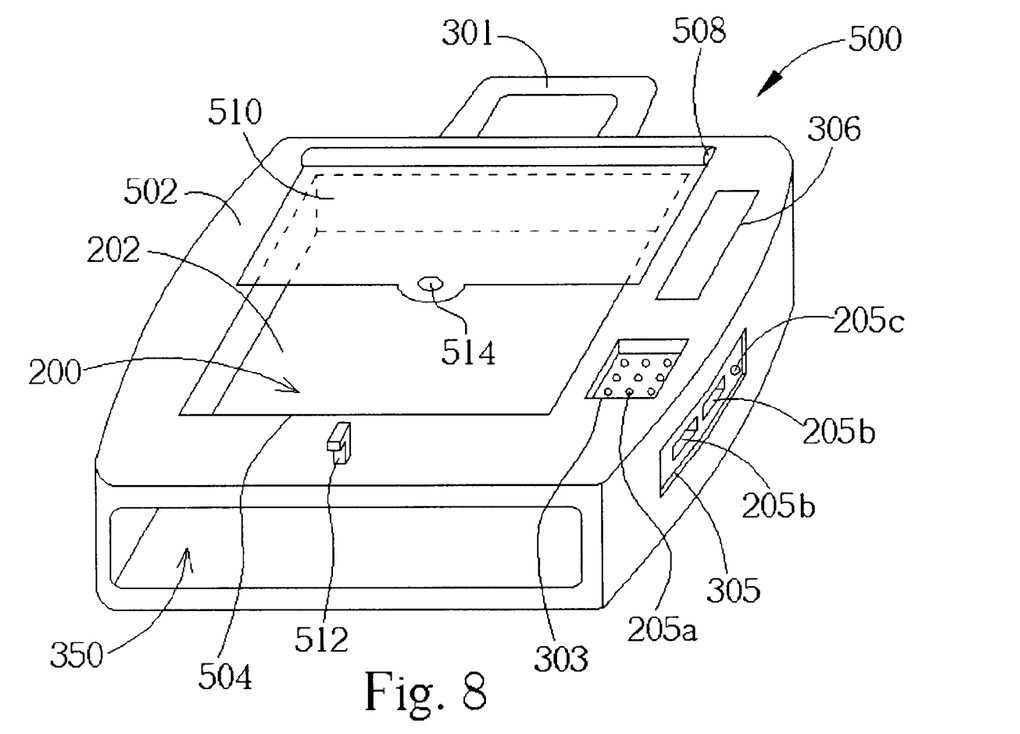
FIG. 8 is a perspective view of another protective case for a tablet PC according to the present invention.

Please refer to FIG. 8. FIG. 8 is a perspective view of a protective case 500 of the tablet PC 200 according to another embodiment of the present invention. This embodiment installs a roller blind aside the hollow display opening 304 shown in FIG. 2. As shown in FIG. 8, the protective case 500 comprises a housing 502 for storing and fixing the tablet PC 200, and a handle 301 connected with the housing 502 for a user to hold. The material of the handle 301, which serves as rain proofing and surface protection, is not necessarily the same material as the housing 502. Additionally, the protective case 500 without the handle 301, also corresponds to spirit of the present invention.

The housing 502 storing the tablet PC 200 comprises an access opening 350, a display opening 504, a button portion 306, an elastic reel 508, a roller blind 510, and a fixing portion 512. The access opening 350, which has an optimum position at one side of the housing 502, is used to insert and remove the tablet PC 200. A zipper (not shown) can be installed within the access opening 350 for opening and closing the access opening 350. Additionally, a user can install an engaging portion (not shown) at one side of the access opening 350, and a fixing portion (not shown) at the other side of the access opening 350 for securing the tablet PC 200 after the tablet PC 200 is positioned inside the protective case 500.

The display portion 504 exposes the touch display panel 202 of the tablet PC 200. The button portion 306 corresponds to the positions of the buttons 204 of the tablet PC 200. The elastic reel 508 is installed at one side of the display opening 504, and the roller blind 510 which comprises an engaging portion 514 installed at one end of the roller blind 510 is rolled around the elastic reel 508. The fixing portion 512 is installed at another side of the display opening 504 of the housing 502. The material of the roller blind 510 is not necessarily a transparent or opaque material.

When the roller blind 510 is pulled out of the elastic reel 508, the engaging portion 514 of the roller blind 510 is secured onto the fixing portion 512. When the engaging portion 514 is separated from the fixing portion 512, the roller blind 510 is rolled back to the elastic reel 508 via the elasticity of the elastic reel 508.

Variations of the button portion 306 of this embodiment are the same as illustrated in FIG. 3 to FIG. 6. In the four variations, the button portion 306 is respectively represented as 306a, 306b, 306c, and 306d.

The protective case 500 that has the retractable roller blind 510 can be used with many kinds of touch panels, such as electromagnetic type, optical type, and resistance type touch panels.

Similar to the other embodiments of the present invention, a user can depress the buttons of the tablet PC through the button portion, which is constructed of a soft transparent material or a soft material with a mark, or has a depressing device.

In contrast to the prior art, the present protective case for storing a tablet PC has the functions of rain proofing, protection, and convenience for carrying. Additionally, when a user wishes to operate the tablet PC, the user does not need to remove the tablet PC from the protective case, only to directly operate or release the engaging portion of roller blind of the protective case.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A protective case for storing a tablet personal computer, the tablet PC comprising a touch display panel and at least one button, the button providing ability to operate the tablet PC, the protective case comprising:

a housing for storing the tablet PC, the housing having an access opening for inserting and taking out the tablet PC, and a display opening for exposing the touch panel of the tablet PC; and a button portion corresponding to a position of the button.

2. The protective case of claim 1 wherein the button portion has a soft transparent sheet so that the button is capable of being depressed through the sheet maintaining the ability to operate the tablet PC when the tablet PC is stored in the housing.

3. The protective case of claim 1 wherein the button portion includes a soft sheet, the soft sheet having a mark for identifying the position of the button so that the button is capable of being depressed through the sheet maintaining the ability to operate the tablet PC when the tablet PC is stored in the housing.

4. The protective case of claim 1 wherein the button portion comprises a depressing device, and the button is capable of being depressed through the depressing device maintaining the ability to operate the tablet PC when the tablet PC is stored in the housing.

5. The protective case of claim 1 wherein the button portion exposes the button of the tablet PC.

6. The protective case of claim 1 further comprising:

an elastic reel installed at one side of the display opening; and a roller blind which is capable of being rolled around the reel to expose the touch display panel and is capable of being rolled down to hide the touch display panel.

7. A protective case for storing a tablet personal computer, the tablet PC comprising a touch display panel and at least one button providing operational ability to the tablet PC, the protective case comprising:

a housing for storing the tablet PC, the housing having an access opening for inserting and taking out the tablet PC;

a display portion corresponding to the touch display panel of the tablet PC and separated from the touch display panel by less than a predetermined distance, the display portion being formed of a transparent material and having a smooth surface wherein a user is capable of interfacing with the touch display panel through touching the display portion; and a button portion corresponding to a position of the button.

8. The protective case of claim 7 wherein the transparent material is a soft material, the user interfacing with the touch display panel by touching the display portion.

9. The protective case of claim 7 wherein the button portion has a soft transparent sheet so that the button is capable of being depressed through the sheet maintaining the ability to operate the tablet PC when the tablet PC is stored in the housing.

10. The protective case of claim 7 wherein the button portion includes a soft sheet, the soft sheet having a mark for identifying the position of the button so that the button is capable of being depressed through the sheet maintaining the ability to operate the tablet PC when the tablet PC is stored in the housing.

11. The protective case of claim 7 wherein the button portion comprises a depressing device, and the button is capable of being depressed through the depressing device maintaining the ability to operate the tablet PC when the tablet PC is stored in the housing.

12. The protective case of claim 7 wherein the button portion exposes the button of the tablet PC.

13. The protective case of claim 7 wherein the transparent material is a rigid material, the user interfacing with the touch display panel by directly touching the display portion without directly touching the touch display panel.

14. The protective case of claim 8 wherein the display portion and the touch panel are separated by less than 0.6 cm.

15. The protective case of claim 13 wherein the display portion and the touch display panel are separated by less than 2 cm.

16. The protective case of claim 13 wherein the user interfaces with the touch display panel electromagnetically.

17. A protective case for storing a tablet personal computer, the tablet PC comprising a touch display panel, the protective case comprising:

a housing for storing the tablet PC, the housing having an access opening for inserting and taking out the tablet PC, and a display portion opening for exposing the touch display panel of the tablet PC, allowing continued operation of the tablet PC when the tablet PC is stored in housing.

18. A protective case for storing a tablet personal computer, the tablet PC comprising a touch display panel, the protective case comprising:

a housing for storing the tablet PC, the housing having an access opening for inserting and taking out the tablet PC; and a display portion corresponding to the touch display panel and separated from the touch panel by less than a predetermined distance, the display portion being formed of a transparent material and having a smooth surface wherein a user is capable of touching the display portion and interfacing with the touch display panel providing operational ability to the PC using the touch display panel when the tablet PC is stored in the housing.

19. The protective case of claim 18 wherein the display portion and the touch panel are separated by less than 2 cm.

* * * * *